US009751515B2

(12) United States Patent
Kuroba

(10) Patent No.: US 9,751,515 B2
(45) Date of Patent: Sep. 5, 2017

(54) VEHICLE TRAVEL CONTROL APPARATUS, VEHICLE TRAVEL CONTROL METHOD, AND VEHICLE TRAVEL CONTROL PROGRAM

(71) Applicant: HONDA MOTOR CO., LTD., Minato-ku, Tokyo (JP)

(72) Inventor: Yoshiyuki Kuroba, Nishishirakawa-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 15/040,183

(22) Filed: Feb. 10, 2016

(65) Prior Publication Data

US 2016/0236687 A1 Aug. 18, 2016

(30) Foreign Application Priority Data

Feb. 16, 2015 (JP) .................................. 2015-027874

(51) Int. Cl.
*B60W 10/04* (2006.01)
*B60W 50/08* (2012.01)
(Continued)

(52) U.S. Cl.
CPC .......... *B60W 10/04* (2013.01); *B60W 10/188* (2013.01); *B60W 30/17* (2013.01); *B60W 50/087* (2013.01); *B60W 2540/10* (2013.01)

(58) Field of Classification Search
CPC .... B60W 10/04; B60W 10/188; B60W 30/17; B60W 50/087; B60W 2540/10
See application file for complete search history.

(56) References Cited

U.S. PATENT DOCUMENTS 8,126,626 B2* 2/2012 Zagorski .................. B60T 7/22
188/358
2004/0215385 A1* 10/2004 Aizawa .................. B60K 31/00
701/93
(Continued)

FOREIGN PATENT DOCUMENTS

DE 102005022676 A1 11/2006
JP H0368126 U 7/1991
(Continued)

OTHER PUBLICATIONS

Office Action mailed Nov. 18, 2016 for German Application No. 102016202046.3.
(Continued)

*Primary Examiner* — Calvin Cheung
(74) *Attorney, Agent, or Firm* — Carrier Blackman & Associates, P.C.; Joseph P. Carrier; William D. Blackman

(57) ABSTRACT

A vehicle travel control apparatus includes: a detection part that detects an operation state of an accelerator pedal by a driver; an automatic travel control part that performs an automatic travel control in which a vehicle is automatically stopped according to a predetermined condition and independent of the operation of the driver; and an erroneous start limitation control part that limits a drive amount when the vehicle is started according to the operation state of the accelerator pedal detected by the detection part, wherein the erroneous start limitation control part decreases the degree of limitation of the drive amount when the vehicle is started in a case where the vehicle is automatically stopped according to the automatic travel control compared to a case where the vehicle is stopped according to the operation of the driver.

14 Claims, 4 Drawing Sheets

(51) Int. Cl.
*B60W 10/188* (2012.01)
*B60W 30/17* (2012.01)

(56) References Cited

U.S. PATENT DOCUMENTS

| | | | | |
|---|---|---|---|---|
| 2007/0142994 A1* | 6/2007 | Boecker | ............... | B60K 31/04 |
| | | | | 701/93 |
| 2010/0121550 A1* | 5/2010 | Inoue | ............... | B60W 10/06 |
| | | | | 701/94 |
| 2011/0025548 A1* | 2/2011 | Nickolaou | ............... | G01S 13/72 |
| | | | | 342/52 |
| 2012/0283927 A1* | 11/2012 | Reinisch | ............... | B60T 7/22 |
| | | | | 701/70 |
| 2015/0197226 A1* | 7/2015 | Svensson | ............... | B60T 8/268 |
| | | | | 701/70 |

FOREIGN PATENT DOCUMENTS

| | | |
|---|---|---|
| JP | 2012-179936 A | 9/2012 |
| JP | 3191518 U | 6/2014 |
| JP | 2014118889 A | 6/2014 |

OTHER PUBLICATIONS

Notice of Allowance Office Action mailed Sep. 13, 2016 corresponding to Japanese Application No. 2015-027874.

\* cited by examiner

VEHICLE TRAVEL CONTROL APPARATUS, VEHICLE TRAVEL CONTROL METHOD, AND VEHICLE TRAVEL CONTROL PROGRAM

CROSS-REFERENCE TO RELATED APPLICATION

Priority is claimed on Japanese Patent Application No. 2015-027874, filed on Feb. 16, 2015, the contents of which are incorporated herein by reference.

BACKGROUND

Field of the Invention

The present invention relates to a vehicle travel control apparatus, a vehicle travel control method, and a vehicle travel control program.

Background

In the related art, techniques are known in which the drive amount of a vehicle is limited when an abrupt accelerator pedal operation is performed in order to prevent a vehicle erroneous start. In relation to the techniques, a vehicle accelerator pedal erroneous operation response apparatus is disclosed (for example, refer to Japanese Patent Application, Publication No. 2012-179936A). In the apparatus, a vehicle start is restricted according to a determination that an accelerator pedal erroneous operation is performed, and then it is determined that a release operation is performed according to the next operation of the accelerator pedal in a range where the operation amount does not exceed an erroneous operation determination threshold.

SUMMARY

In recent years, researches and implementations of an automatic travel control that automatically stops a vehicle have been conducted. However, in the related art, there may be a case in which an automatic travel control and an erroneous start limitation control cannot be suitably used together and it is impossible to follow the acceleration intent of a driver.

In view of the foregoing, an object of an aspect of the present invention is to cause an automatic travel control and an erroneous start prevention control to be suitably used together.

(1) A vehicle travel control apparatus according to an aspect of the present invention includes: a detection part that detects an operation state of an accelerator pedal by a driver; an automatic travel control part that performs an automatic travel control in which a vehicle is automatically stopped according to a predetermined condition and independent of the operation of the driver; and an erroneous start limitation control part that limits a drive amount when the vehicle is started according to the operation state of the accelerator pedal detected by the detection part, wherein the erroneous start limitation control part decreases the degree of limitation of the drive amount when the vehicle is started in a case where the vehicle is automatically stopped according to the automatic travel control compared to a case where the vehicle is stopped according to the operation of the driver.

(2) In the aspect of the above (1), the erroneous start limitation control part may decrease the degree of limitation of the drive amount in a case where the vehicle is automatically stopped according to the automatic travel control compared to a case where the vehicle is stopped according to the operation of the driver by limiting the drive amount when the vehicle is started in a case where a state quantity that represents the operation state of the accelerator pedal detected by the detection part is equal to or more than a threshold value and increasing the threshold value in a case where the vehicle is automatically stopped according to the automatic travel control to more than the threshold value in a case where the vehicle is stopped according to the operation of the driver.

(3) In the aspect of the above (1) or (2), the automatic travel control part may control a braking force output part of the vehicle to output a braking force for automatically stopping the vehicle and may moderate or release the output of the braking force according to the operation to the accelerator pedal of the driver.

(4) In the aspect of any one of the above (1) to (3), the automatic travel control part may automatically restart the automatic travel control according to the operation to the accelerator pedal of the driver in a case where the vehicle is automatically stopped according to the automatic travel control.

(5) In the aspect of any one of the above (1) to (3), the automatic travel control part may stop the automatic travel control according to the operation to the accelerator pedal of the driver in a case where the vehicle is automatically stopped according to the automatic travel control.

(6) A vehicle travel control method according to another aspect of the present invention includes by way of a computer: detecting an operation state of an accelerator pedal by a driver; performing an automatic travel control in which a vehicle is automatically stopped according to a predetermined condition independent of the operation of the driver; and decreasing, when limiting a drive amount when the vehicle is started according to the detected operation state of the accelerator pedal, the degree of limitation of the drive amount when the vehicle is started in a case where the vehicle is automatically stopped according to the automatic travel control compared to a case where the vehicle is stopped according to the operation of the driver.

(7) According to still another aspect of the present invention, there is provided a non-transitory computer-readable recording medium including a vehicle travel control program for causing a computer to: detect an operation state of an accelerator pedal by a driver; perform an automatic travel control in which a vehicle is automatically stopped according to a predetermined condition independent of the operation of the driver; and decrease, when limiting a drive amount when the vehicle is started according to the detected operation state of the accelerator pedal, the degree of limitation of the drive amount when the vehicle is started in a case where the vehicle is automatically stopped according to the automatic travel control compared to a case where the vehicle is stopped according to the operation of the driver.

According to the aspect of the above (1), (2), (6), and (7), the degree of limitation of the drive amount when the vehicle is started is decreased in a case where the vehicle is automatically stopped according to the automatic travel control compared to a case where the vehicle is stopped according to an operation of the driver. Thereby, since it is possible to prevent an erroneous start prevention control from interfering with an automatic travel control, the automatic travel control and the erroneous start prevention control can be suitably used together.

According to the aspect of the above (3), the output of the braking force is moderated or released according to an operation to the accelerator pedal of the driver, and there is a temporal delay in moderating or releasing the braking controlled according to the automatic travel control. Thereby, even when the operation amount of the accelerator pedal by the driver is increased, since it is possible to prevent an erroneous start prevention control from interfering with an automatic travel control, the automatic travel control and the erroneous start prevention control can be suitably used together.

According to the aspect of the above (4), when the automatic travel control part automatically restarts the automatic travel control according to an operation to the accelerator pedal of the driver in a case where the vehicle is automatically stopped according to the automatic travel control, the automatic travel control part prevents the erroneous start prevention control from interfering with the automatic travel control even when the operation amount to the accelerator pedal that triggers the restart of the automatic travel control is large. Therefore, the acceleration of the vehicle according to the automatic control is not prevented.

According to the aspect of the above (5), when the automatic travel control part stops the automatic travel control according to an operation to the accelerator pedal of the driver in a case where the vehicle is automatically stopped according to the automatic travel control, the automatic travel control part prevents the erroneous start prevention control from interfering with the automatic travel control even when moderating or releasing of braking force is temporally delayed with respect to the operation to the accelerator pedal of the driver. Therefore, the acceleration by the operation to the accelerator pedal of the driver is not prevented.

DESCRIPTION OF THE EMBODIMENTS

Hereinafter, a vehicle travel control apparatus, a vehicle travel control method, and a vehicle travel control program according to embodiments of the present invention will be described with reference to the drawings.

First Embodiment

Figure 1:
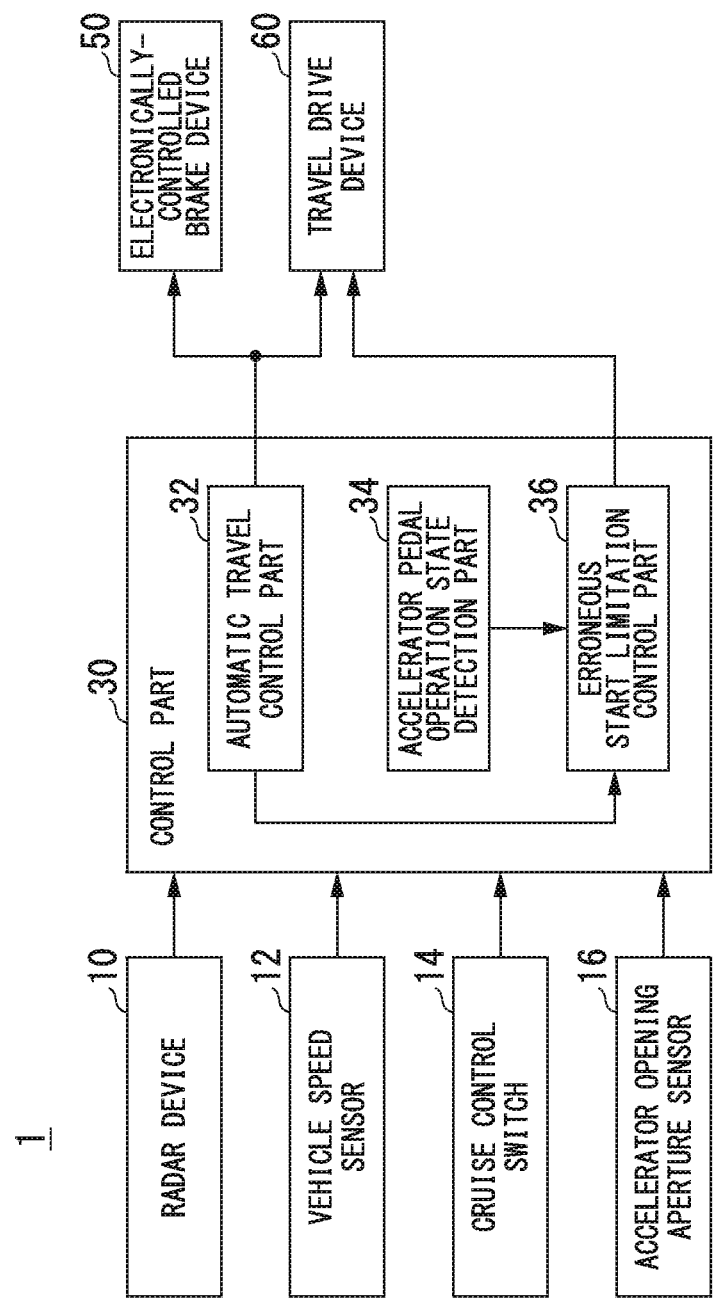
FIG. 1 is a diagram showing an example of a functional configuration of a vehicle travel control apparatus.

FIG. 1 is a diagram showing an example of a functional configuration of a vehicle travel control apparatus 1. The vehicle travel control apparatus 1 includes a radar device 10, a vehicle speed sensor 12, a cruise control switch 14, an accelerator opening aperture sensor 16, a control part 30, an electronically-controlled brake device 50, and a travel drive device 60.

The radar device 10 is, for example, attached to the back side of an emblem plate of a vehicle in which the vehicle travel control apparatus 1 is installed, the periphery of a bumper or a front grille, or the like. The radar device 10 radiates electromagnetic waves such as a millimeter wave in the front direction of the vehicle. The radar device 10 is, for example, a millimeter wave radar device that receives a reflected wave of the radiated electromagnetic waves by an obstacle or the like and analyzes the received reflected wave to thereby specify the position (distance, and azimuth or lateral position) of the obstacle. The radar device 10, for example, detects an inter-vehicle distance, a relative speed, a lateral position (or azimuth), and the like with respect to a preceding vehicle by use of a FM-CW (Frequency-Modulated Continuous-Wave) method and outputs the detection result to the control part 30. Further, for example, a camera that captures an image of the front direction of the vehicle may be provided in addition to the radar device 10. The camera is, for example, a digital camera that uses a solid-state image sensing device such as a CCD (Charge Coupled Device) or a CMOS (Complementary Metal Oxide Semiconductor).

The camera repeatedly captures an image of the front direction of the vehicle, for example, at a predetermined period. Further, the vehicle travel control apparatus 1 analyzes the image captured by the camera and specifies the position (distance, and azimuth or lateral position) of the obstacle in a real space according to the position of the obstacle in the image. Further, the vehicle travel control apparatus 1 may recognize the position of the obstacle by integrating a position specified by the radar device 10 and a position specified by the analysis of the captured image by the camera such that the distance is emphasized with respect to the position specified by the radar device 10 and the azimuth or lateral position is emphasized with respect to the position specified by the analysis of the captured image by the camera. Further, a device that specifies the positions of a vehicle and an obstacle such as a laser radar and an ultrasonic sensor may be provided in place of the radar device 10. Alternatively, a laser radar, an ultrasonic sensor, and the like may be provided in addition to the radar device 10.

The vehicle speed sensor 12 includes a wheel speed sensor attached to each wheel and a controller that integrates sensor output values of wheel speed sensors to generate a vehicle speed signal. The vehicle speed sensor 12 detects a vehicle travel speed and outputs a vehicle speed signal that represents the detected travel speed to the control part 30.

The cruise control switch 14 is attached to a steering wheel or the like. The cruise control switch 14 accepts a command of automatic travel control by the driver and outputs a signal that represents acceptance to the control part 30. The automatic travel control is, for example, an ACC (Adaptive Cruise Control) with an LSF (Low Speed Following) control function. Hereinafter, this is referred to simply as an LSF. The LSF is a control in which the inter-vehicle distance to a preceding vehicle that travels in front of a vehicle in the same direction as the vehicle is maintained constant, and in which the vehicle is automatically stopped independent of an operation of the driver when the preceding vehicle becomes a low speed travel state or a stop state. The accelerator opening aperture sensor 16 detects an accelerator opening aperture AC as an operation amount of an accelerator pedal and outputs an accelerator opening aperture signal that represents the detected accelerator opening aperture AC to the control part 30.

The control part 30 is realized, for example, by a computer device in which an internal bus connects a processor such as at least one CPU (Central Processing Unit), a storage device such as a ROM (Read Only Memory), a RAM (Random Access Memory), a HDD (Hard Disk Drive), an EEPROM (Electrically Erasable Programmable Read-Only Memory), and a flash memory, a communication interface for performing communication with other devices in the vehicle, and the like.

The control part 30 includes an automatic travel control part 32, an accelerator pedal operation state detection part 34, and an erroneous start limitation control part 36. These functional parts are, for example, software functional parts that function by executing a program stored in the storage device by the processor. The program executed by the processor may be stored in the storage device in advance before shipping of the vehicle. Alternatively, a program stored in a portable storage medium may be installed in the storage device of the control part 30.

The automatic travel control part 32 controls the electronically-controlled brake device 50 or the travel drive device 60 in order to perform the LSF described above. The automatic travel control part 32 controls the electronically-controlled brake device 50 or the travel drive device 60 to stop the vehicle depending on the state of the preceding vehicle.

The accelerator pedal operation state detection part 34 detects an operation state of the accelerator pedal. The operation state of the accelerator pedal is, for example, the accelerator opening aperture AC, the speed and acceleration of accelerator pedal operation, or the combination thereof. Hereinafter, the detection target to be detected by the accelerator pedal operation state detection part 34 is the accelerator opening aperture AC as an example.

The erroneous start limitation control part 36 limits a drive amount when the vehicle is started according to the operation state of the accelerator pedal detected by the accelerator pedal operation state detection part 34, when the vehicle is started from a state where the vehicle is stopped (erroneous start limitation control). For example, the erroneous start limitation control part 36 performs the erroneous start limitation control when the accelerator opening aperture AC is equal to or more than a threshold value Th. The erroneous start limitation control part 36 limits a drive amount when the vehicle is started, for example, by controlling the opening aperture of a throttle valve which is controlled to increase in accordance with the increase of the accelerator opening aperture AC under normal conditions, such that the opening aperture of the throttle valve should not follow the increase of the accelerator opening aperture AC.

Further, the erroneous start limitation control part 36 moderates the control degree of the erroneous start limitation control when the LSF is performed. The erroneous start limitation control part 36 moderates the control degree of the erroneous start limitation control, for example, by increasing the threshold value Th with respect to the accelerator opening aperture AC. Note that, the erroneous start limitation control part 36 may be configured such that the erroneous start limitation control part 36 moderates the control degree of the erroneous start limitation control by stopping the erroneous start limitation control.

The electronically-controlled brake device 50 includes: a control part that controls each part of the device; a master cylinder in which a brake operation applied to a brake pedal is transmitted as an oil pressure; a reservoir tank that reserves a brake fluid; a brake actuator that adjusts a braking force output to each wheel; and the like. The control part of the electronically-controlled brake device 50 controls a brake actuator or the like such that a brake torque in accordance with the pressure generated by the master cylinder is output to each wheel. Further, the control part of the electronically-controlled brake device 50 controls a brake actuator or the like by controlling the pressure generated by the master cylinder such that when a control signal is input from the automatic travel control part 32, a brake torque having an intensity indicated by the control signal is output to each wheel. The electronically-controlled brake device 50 is not limited to the above-described electronically-controlled brake device which is operated by the oil pressure and may be an electronically-controlled brake device which is operated by an electric actuator.

The travel drive device 60 is, for example, a drive source such as an engine or a travel motor. Further, the travel drive device 60 may include, for example, an engine and a travel motor. The travel drive device 60 is only an engine as an example. The travel drive device 60 is controlled depending on the control amount output by the automatic travel control part 32.

Figure 2:
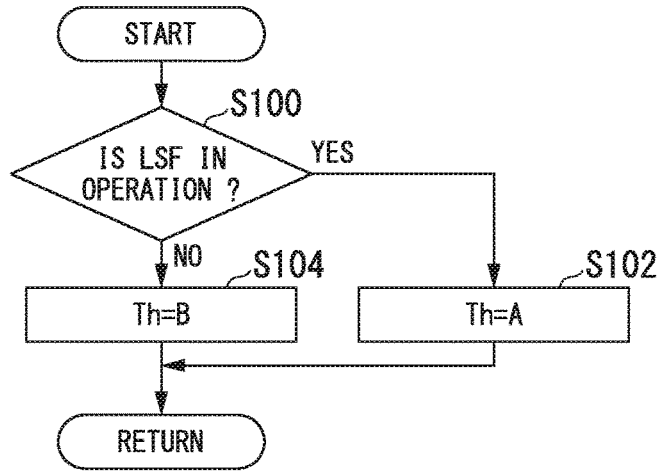
FIG. 2 is a flowchart showing a process flow of a threshold value determination performed by a control part.

FIG. 2 is a flowchart showing a process flow of a threshold value determination performed by the control part 30. First, the erroneous start limitation control part 36 determines whether or not the vehicle is performing the LSF (step S100). When the vehicle is performing the LSF, the erroneous start limitation control part 36 sets the threshold value of erroneous start limitation to A (step S102). When the vehicle is not performing the LSF, the erroneous start limitation control part 36 sets the threshold value of erroneous start limitation to B (step S104). Note that, the threshold value A is a value that is larger than the threshold value B (A>B). Thus, one routine of the present flowchart is finished.

Figure 3:
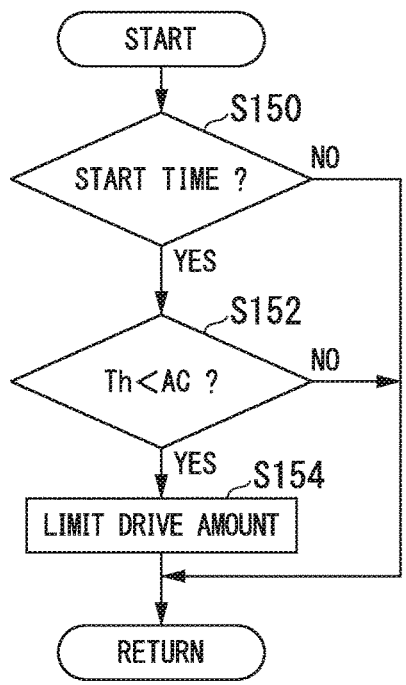
FIG. 3 is a flowchart showing a process flow of drive amount limitation performed by the control part.

FIG. 3 is a flowchart showing a process flow of drive amount limitation performed by the control part 30. The process performed by the present flowchart is performed in parallel with the process shown in the flowchart of FIG. 2 described above. Note that, the present process is described as the vehicle is automatically stopped according to the automatic travel control.

First, the erroneous start limitation control part 36 determines whether or not the vehicle is about to start according to the operation state of the accelerator pedal that is acquired from the accelerator pedal operation state detection part 34 (step S150). When the vehicle is about to start is, for example, when the vehicle speed is less than a very small threshold value. When the vehicle is not about to start, one routine of the present flowchart is finished. When the vehicle is about to start, the erroneous start limitation control part 36 determines whether or not the accelerator opening aperture AC exceeds the threshold value Th according to the threshold value Th set in the process of step S102 or step S104 (step S152). When the accelerator opening aperture AC does not exceed the threshold value, one routine of the present flowchart is finished. When the accelerator opening aperture AC exceeds the threshold value, the erroneous start limitation control part 36 commands the automatic travel control part 32 to limit the drive amount of the vehicle (step S154). Thus, one routine of the present flowchart is finished.

Figure 4:
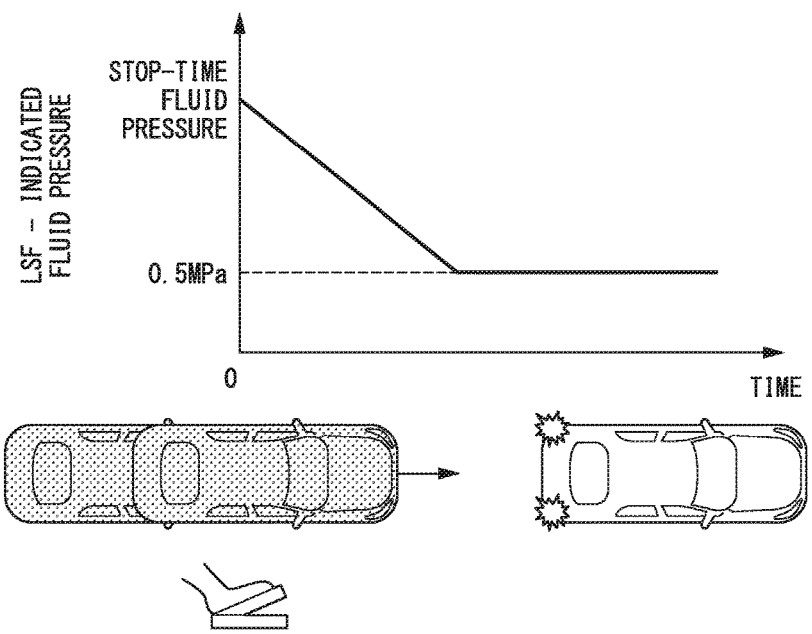
FIG. 4 is a view showing a transition in the indicated fluid pressure of a master cylinder of an electronically-controlled brake device after a vehicle is stopped according to an LSF.

FIG. 4 is a view showing a transition in the indicated fluid pressure of the master cylinder of the electronically-controlled brake device 50 after a vehicle is stopped according to the LSF. The vertical axis represents fluid pressure (indicated pressure of the master cylinder) generated in the master cylinder during performing the LSF. The horizontal axis represents time.

During performing the LSF, a control to the electronically-controlled brake device 50 that is set in a program for performing the LSF is performed. For example, when the vehicle is stopped, as shown in FIG. 4, the indicated fluid pressure of the master cylinder of the electronically-controlled brake device 50 is set to a predetermined stop-time fluid pressure. In this state, when the accelerator pedal is operated by the driver at the time of zero, the indicated fluid pressure of the master cylinder is controlled to be decreased with a predetermined gradient to a level (for example, 0.5 [MP]) at which a moderate braking force is output. Then, a control may be performed such that the level is maintained. For example, when the inter-vehicle distance to a preceding vehicle that is at a stop is decreased at a low speed, the control of the electronically-controlled brake device 50 shown as an example in FIG. 4 is performed. In this way, during performing the LSF, even when the driver operates the accelerator pedal in order to start the vehicle, the output of the braking force may continue according to the electronically-controlled brake device 50. Further, immediately after the driver operates the accelerator pedal to decrease the braking force as the LSF, a time lag may occur which decreases the fluid pressure of the master cylinder of the electronically-controlled brake device 50, and the braking force may still remain. As a result, the driver can tend to increase the operation amount of the accelerator pedal in order to overcome the brake compared to a case where the LSF is not in operation and the vehicle is started according to the operation of the driver from a state in which the vehicle is stopped.

Figure 5:
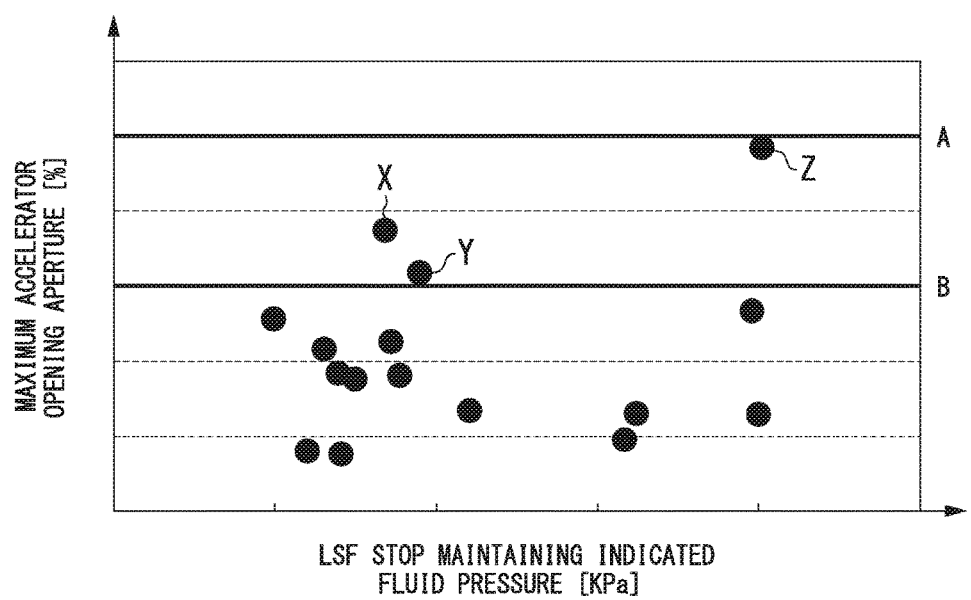
FIG. 5 is a view showing an example of a maximum value distribution of accelerator opening apertures at the start with respect to the indicated fluid pressure of the master cylinder during performing the LSF.

FIG. 5 is a view showing an example of a maximum value distribution of accelerator opening apertures AC at the start with respect to the indicated fluid pressure of the master cylinder during performing the LSF. The vertical axis represents maximum accelerator opening aperture (%) operated by the driver. The horizontal axis represents the indicated fluid pressure of the master cylinder after the vehicle is stopped according to the LSF. For example, when the threshold value Th of erroneous start limitation is set to B, there may be a case where the erroneous start limitation control is started when the accelerator pedal is operated so as to overcome the brake, for example, as represented by X, Y, and Z in FIG. 5. For example, when the operation amount of the accelerator pedal operated by the driver is equal to or more than B, the erroneous start limitation control part determines that an erroneous start is made against the driver's intention to start or accelerate the vehicle and controls the vehicle to be braked. Therefore, there may be a case in which the vehicle cannot be started or cannot be accelerated as intended by the driver. As a result, the driver may feel bothered. On the other hand, the erroneous start limitation control part 36 of the present embodiment decreases the degree of limitation of the drive amount when the vehicle is started. For example, the threshold value Th of erroneous start limitation is set to A.

Even when the driver greatly presses the accelerator pedal (for example, X, Y, and Z in FIG. 5), the erroneous start limitation control is not performed, and it is possible to start and accelerate the vehicle according to the driver's intention. As a result, as it is possible to prevent the erroneous start prevention control from interfering with the automatic travel control, the automatic travel control and the erroneous start prevention control can be suitably used together.

According to the vehicle travel control apparatus 1 of the first embodiment described above, the degree of limitation of the drive amount when the vehicle is started is decreased in a case where the vehicle is automatically stopped according to the automatic travel control and the LSF is in operation, compared to a case where the vehicle is stopped according to an operation of the driver. Therefore, it is possible to prevent the erroneous start prevention control from interfering with the automatic travel control and to realize control of the vehicle according to the driver's intention. As a result, the automatic travel control and the erroneous start prevention control can be suitably used together.

Further, according to the vehicle travel control apparatus 1 of the first embodiment described above, an example is disclosed in which, after the vehicle is automatically stopped according to the automatic travel control, the vehicle is started and accelerated in response to the operation of the accelerator pedal of the driver, and the inter-vehicle distance to a preceding vehicle that is at a stop is decreased. In this case, the LSF may be continued or may be stopped. When the LSF is continued, after the inter-vehicle distance between the vehicle and the preceding vehicle is decreased according to the operation of the accelerator pedal (after a control according to the driver's intention is temporarily performed), it is possible to release the braking force and perform a control to follow the preceding vehicle as described later in a second embodiment. When the LSF is stopped, after that, the vehicle continues a travel in accordance with the operation of the driver. When the inter-vehicle distance between the vehicle and the preceding vehicle is decreased according to the operation of the accelerator pedal of the driver, it is possible to prevent the erroneous start prevention control from interfering with the automatic travel control according to the vehicle travel control apparatus 1 of the first embodiment even when moderating or releasing of braking force is temporally delayed with respect to the operation to the accelerator pedal of the driver. Further, pressing of the accelerator pedal may be used simply as an alternative to a switch operation, and the inter-vehicle distance may be automatically decreased. In this case, it is not necessary that the pressing of the accelerator pedal is an accelerator pedal operation for the driver to overcome the brake when starting. However, since the pressing of the accelerator pedal is an alternative to the switch operation, there may be a case in which the pressing of the accelerator pedal is excessive, and the erroneous start prevention control interferes with the automatic travel control in a similar manner. Even in such a case where the operation amount to the accelerator pedal is large, the vehicle travel control apparatus 1 of the first embodiment prevents the erroneous start prevention control from interfering with the automatic travel control. Therefore, the acceleration of the vehicle according to the automatic control is not prevented.

Second Embodiment

Hereinafter, a second embodiment of the present invention is described. Here, a process content performed by the erroneous start limitation control part 36 that is a difference from the first embodiment is described, and a description of a common function or the like with the first embodiment is omitted. The first embodiment is described with respect to a control in which the inter-vehicle distance to a preceding vehicle that is at a stop is decreased and a predetermined amount of the braking force remains even when the accelerator pedal is operated. On the other hand, in the second embodiment, a process is described in which, according to an operation of the accelerator pedal when the vehicle is started, the braking force as an LSF is stopped to restart the LSF.

Figure 6:
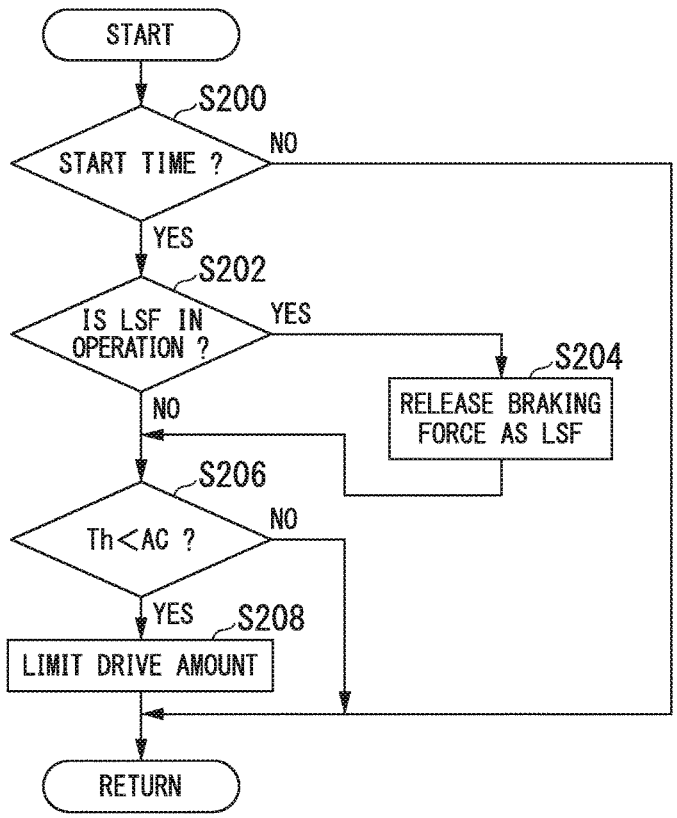
FIG. 6 is a flowchart showing a process flow performed by an erroneous start limitation control part of a second embodiment.

FIG. 6 is a flowchart showing a process flow performed by the erroneous start limitation control part 36 of the second embodiment. In the present flowchart, it is assumed that a vehicle is stopped according to the automatic travel control and the LSF is in operation. Further, it is assumed that the braking force as the LSF is released according to the operation of the accelerator pedal by the driver of the vehicle. Note that, the process of the present flowchart is performed in parallel with the process shown in the flowchart of FIG. 2 described above.

First, the erroneous start limitation control part 36 determines whether or not the vehicle is about to start according to the operation state of the accelerator pedal that is acquired from the accelerator pedal operation state detection part 34 (step S200). When the vehicle is not about to start, one routine of the present flowchart is finished. When the vehicle is about to start, the erroneous start limitation control part 36 determines whether or not the LSF is in operation (step S202).

When the LSF is in operation, the erroneous start limitation control part 36 releases the braking force that is maintained as the LSF (step S204) and moves the process to step S206. Thereby, it is possible to limit the decrease of the start acceleration due to the LSF. As a result, the vehicle can be started without increasing the accelerator opening aperture AC too much. When the LSF is not in operation, the erroneous start limitation control part 36 moves the process to step S206.

Next, the erroneous start limitation control part 36 determines, according to the threshold value Th of erroneous start limitation that is set in the process of step S102 or step S104 of FIG. 2, whether or not the accelerator opening aperture AC exceeds the threshold value Th (step S206).

When the accelerator opening aperture AC does not exceed the threshold value Th, one routine of the present flowchart is finished. When the accelerator opening aperture AC exceeds the threshold value Th, the erroneous start limitation control part 36 commands the automatic travel control part 32 to limit the drive amount of the vehicle (step S208). One routine of the present flowchart is finished.

Figure 7:
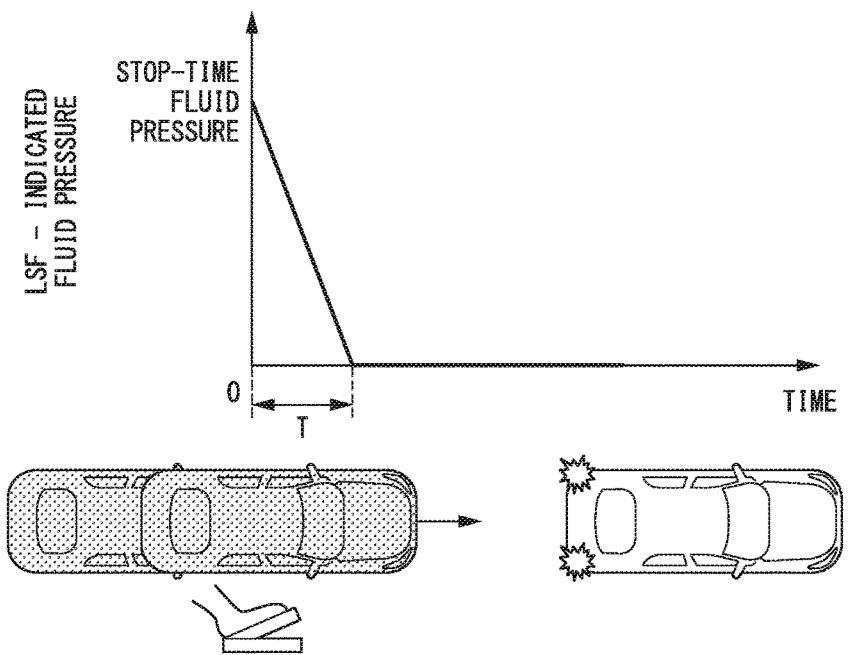
FIG. 7 is a view showing another example of a transition in the indicated fluid pressure of the master cylinder of the electronically-controlled brake device after the vehicle is stopped according to the LSF.

FIG. 7 is a view showing another example of a transition in the indicated fluid pressure of the master cylinder of the electronically-controlled brake device 50 after the vehicle is stopped according to the LSF. The vertical axis represents the indicated fluid pressure of the master cylinder during performing the LSF, and the horizontal axis represents time. During performing the LSF, a control to the electronically-controlled brake device 50 that is set in a program for performing the LSF is performed. For example, when the vehicle is stopped, as shown in FIG. 7, the indicated fluid pressure of the master cylinder of the electronically-controlled brake device 50 is set to a predetermined stop-time fluid pressure. In this state, when the accelerator pedal is operated by the driver at the time of zero, the indicated fluid pressure of the master cylinder is decreased with a predetermined gradient to zero. In this case, a time T is required for the liquid pressure to be changed from the stop-time fluid pressure to zero. Immediately after the driver operates the accelerator pedal to release the braking force as the LSF, a time lag may occur which decreases the fluid pressure of the master cylinder of the electronically-controlled brake device 50, and the braking force may still remain. As a result, the driver can tend to increase the operation amount of the accelerator pedal in order to overcome the brake compared to a case where the LSF is not in operation and the vehicle is started according to the operation of the driver from a state in which the vehicle is stopped. As a result, there may be a case in which the erroneous start limitation control part determines that an erroneous start is made against the driver's intention to start or accelerate the vehicle and controls the vehicle to be braked. On the other hand, the erroneous start limitation control part 36 of the present embodiment decreases the degree of limitation of the drive amount when the vehicle is started. That is, the threshold value Th of erroneous start limitation is set to be larger compared to a threshold value of erroneous start limitation in a case where the vehicle is started according to the operation of the driver from a state where the vehicle is stopped. As a result, it is possible to prevent the erroneous start prevention control from interfering with the automatic travel control, and the automatic travel control and the erroneous start prevention control can be suitably used together.

According to the vehicle travel control apparatus 1 of the second embodiment described above, even when the output of the braking force as the LSF is moderated or released according to the operation to the accelerator pedal of the driver, the degree of limitation of the drive amount when the vehicle is started is decreased compared to a case where the vehicle is stopped according to the operation of the driver. Accordingly, advantages similar to the first embodiment are provided, and it is possible to limit the decrease of the start acceleration according to the automatic travel control.

Further, according to the vehicle travel control apparatus 1 of the second embodiment described above, an example is disclosed in which, after the vehicle is automatically stopped according to the automatic travel control, the vehicle is started and accelerated in response to the accelerator pedal operation of the driver. In this case, the LSF may be continued or may be stopped. When the LSF is continued, after the vehicle is started in response to the accelerator pedal operation, the LSF is continued according to the driver's intension to start, and the automatic travel control is performed. When the LSF is stopped, after that, a travel is continued in accordance with the operation of the driver. In this case, even when moderating or releasing of braking force is temporally delayed with respect to the operation to the accelerator pedal of the driver, it is possible to prevent the erroneous start prevention control from interfering with the automatic travel control according to the vehicle travel control apparatus 1 of the second embodiment. Further, pressing of the accelerator pedal may be used simply as an alternative to a switch operation, and the LSF may be restarted. In this case, it is not necessary that the pressing of the accelerator pedal is an accelerator pedal operation for the driver to overcome the brake when starting. However, since the pressing of the accelerator pedal is an alternative to the switch operation, there may be a case in which the driver excessively presses the accelerator pedal, and the erroneous start prevention control interferes with the automatic travel control in a similar manner. Even in such a case, the vehicle travel control apparatus 1 of the second embodiment prevents the erroneous start prevention control from interfering with the automatic travel control. Therefore, the acceleration of the vehicle according to the automatic control is not prevented.

Further, in the above, it is assumed that, when the vehicle is automatically stopped according to the LSF, the braking force is continued to be imparted; however, the embodiment is not limited thereto. When the stop-time fluid pressure is zero and also in a case where the driver intentionally presses the accelerator pedal in order to restart the LSF, there may be a case in which the accelerator opening aperture AC exceeds the threshold value Th. Specifically, in a case where the pressing of the accelerator pedal is simply an alternative to the switch operation, there may be a case in which the driver greatly presses the accelerator pedal. In response to this, the erroneous start limitation control part 36 of the present embodiment increases the threshold value Th of erroneous start limitation to prevent the erroneous start prevention control from interfering with the automatic travel control, and thereby the automatic travel control and the erroneous start prevention control can be suitably used together.

Although embodiments of the present invention have been described, the present invention is not limited to such embodiments, and various changes and substitutions can be made without departing from the scope of the invention.

What is claimed is:

1. A vehicle travel control apparatus comprising:
   a detection part that detects an operation state of an accelerator pedal by a driver;
   an automatic travel control part that performs an automatic travel control in which a vehicle is automatically stopped according to a predetermined condition and independent of the operation of the driver; and
   an erroneous start limitation control part that limits a drive amount when the vehicle is started according to the operation state of the accelerator pedal detected by the detection part, wherein
   the erroneous start limitation control part decreases the degree of limitation of the drive amount when the vehicle is started in a case where the vehicle is automatically stopped according to the automatic travel control compared to a case where the vehicle is stopped according to the operation of the driver.

2. The vehicle travel control apparatus according to claim 1, wherein
   the erroneous start limitation control part decreases the degree of limitation of the drive amount in a case where the vehicle is automatically stopped according to the automatic travel control compared to a case where the vehicle is stopped according to the operation of the driver by limiting the drive amount when the vehicle is started in a case where a state quantity that represents the operation state of the accelerator pedal detected by the detection part is equal to or more than a threshold value and increasing the threshold value in a case where the vehicle is automatically stopped according to the automatic travel control to more than the threshold value in a case where the vehicle is stopped according to the operation of the driver.

3. The vehicle travel control apparatus according to claim 2, wherein
   the automatic travel control part controls a braking force output part of the vehicle to output a braking force for automatically stopping the vehicle and moderates or releases the output of the braking force according to the operation to the accelerator pedal of the driver.

4. The vehicle travel control apparatus according to claim 3, wherein
   the automatic travel control part automatically restarts the automatic travel control according to the operation to the accelerator pedal of the driver in a case where the vehicle is automatically stopped according to the automatic travel control.

5. The vehicle travel control apparatus according to claim 3, wherein
   the automatic travel control part stops the automatic travel control according to the operation to the accelerator pedal of the driver in a case where the vehicle is automatically stopped according to the automatic travel control.

6. The vehicle travel control apparatus according to claim 2, wherein
   the automatic travel control part automatically restarts the automatic travel control according to the operation to the accelerator pedal of the driver in a case where the vehicle is automatically stopped according to the automatic travel control.

7. The vehicle travel control apparatus according to claim 2, wherein
   the automatic travel control part stops the automatic travel control according to the operation to the accelerator pedal of the driver in a case where the vehicle is automatically stopped according to the automatic travel control.

8. The vehicle travel control apparatus according to claim 1, wherein
   the automatic travel control part controls a braking force output part of the vehicle to output a braking force for automatically stopping the vehicle and moderates or releases the output of the braking force according to the operation to the accelerator pedal of the driver.

9. The vehicle travel control apparatus according to claim 8, wherein
   the automatic travel control part automatically restarts the automatic travel control according to the operation to the accelerator pedal of the driver in a case where the vehicle is automatically stopped according to the automatic travel control.

10. The vehicle travel control apparatus according to claim 8, wherein
    the automatic travel control part stops the automatic travel control according to the operation to the accelerator pedal of the driver in a case where the vehicle is automatically stopped according to the automatic travel control.

11. The vehicle travel control apparatus according to claim 1, wherein
    the automatic travel control part automatically restarts the automatic travel control according to the operation to the accelerator pedal of the driver in a case where the vehicle is automatically stopped according to the automatic travel control.

12. The vehicle travel control apparatus according to claim 1, wherein
    the automatic travel control part stops the automatic travel control according to the operation to the accelerator pedal of the driver in a case where the vehicle is automatically stopped according to the automatic travel control.

13. A vehicle travel control method comprising by way of a computer:
    detecting an operation state of an accelerator pedal by a driver;
    performing an automatic travel control in which a vehicle is automatically stopped according to a predetermined condition independent of the operation of the driver; and decreasing, when limiting a drive amount when the vehicle is started according to the detected operation state of the accelerator pedal, the degree of limitation of the drive amount when the vehicle is started in a case where the vehicle is automatically stopped according to the automatic travel control compared to a case where the vehicle is stopped according to the operation of the driver.

14. A non-transitory computer-readable recording medium comprising a vehicle travel control program for causing a computer to:

detect an operation state of an accelerator pedal by a driver;

perform an automatic travel control in which a vehicle is automatically stopped according to a predetermined condition independent of the operation of the driver; and decrease, when limiting a drive amount when the vehicle is started according to the detected operation state of the accelerator pedal, the degree of limitation of the drive amount when the vehicle is started in a case where the vehicle is automatically stopped according to the automatic travel control compared to a case where the vehicle is stopped according to the operation of the driver.

* * * * *